United States Patent [19]

Yoshioka et al.

[11] Patent Number: 4,777,016
[45] Date of Patent: Oct. 11, 1988

[54] FUEL ASSEMBLY

[75] Inventors: Toshiro Yoshioka; Takao Igarashi; Takaaki Mochida; Michihiro Ozawa, all of Hitachi, Japan

[73] Assignees: Hitachi, Ltd., Tokyo; Hitachi Engineering Co., Ltd., Ibaraki, both of Japan

[21] Appl. No.: 870,400

[22] Filed: Jun. 4, 1986

[30] Foreign Application Priority Data

Jun. 5, 1985 [JP] Japan ............... 60-120488

[51] Int. Cl.⁴ .................................................. G21C 3/32
[52] U.S. Cl. ..................... 376/444; 376/423; 376/428; 376/904
[58] Field of Search ............... 376/444, 447, 443, 352, 376/446, 428, 423, 904

[56] References Cited

U.S. PATENT DOCUMENTS

| | | | |
|---|---|---|---|
| 3,132,076 | 5/1964 | West et al. ............................ | 376/447 |
| 3,689,358 | 9/1972 | Smith et al. ............................ | 376/444 |
| 3,741,868 | 6/1973 | Qurnell et al. ....................... | 376/446 |
| 3,802,995 | 4/1974 | Fritz et al. ........................... | 376/440 |
| 3,808,098 | 4/1974 | Fredin ................................... | 376/444 |
| 4,314,884 | 2/1982 | Fanning et al. ...................... | 376/444 |
| 4,420,458 | 12/1983 | Dunlap et al. ........................ | 376/447 |
| 4,526,746 | 7/1985 | Fredin ................................... | 376/444 |
| 4,675,154 | 6/1987 | Nelson et al. ......................... | 376/444 |

FOREIGN PATENT DOCUMENTS

| | | | |
|---|---|---|---|
| 2154753 | 11/1973 | France . | |
| 3215363 | 11/1982 | Fed. Rep. of Germany . | |
| 0040986 | 4/1975 | Japan . | |
| 0032488 | 3/1977 | Japan ................................... | 376/443 |
| 0013981 | 1/1984 | Japan . | |
| 0180390 | 10/1984 | Japan ................................... | 376/438 |
| 0052999 | 12/1984 | Japan ................................... | 376/444 |
| 0220686 | 12/1984 | Japan ................................... | 376/444 |

Primary Examiner—Deborah L. Kyle
Assistant Examiner—Daniel Wasil
Attorney, Agent, or Firm—Antonelli, Terry & Wands

[57] ABSTRACT

A fuel assembly including a channel box, upper and lower tie plates, fuel rods inserted in the channel box and held at upper and lower end portions by the upper and lower tie plates, a water rod disposed among the fuel rods and spacers for keeping the fuel rods and the water rod spaced from one another. The water rod has a diameter larger than that of each of the fuel rods and the upper end of the water rod has a height substantially as high as an upper end of an effective enriched fuel section of each fuel rod.

14 Claims, 3 Drawing Sheets

FUEL ASSEMBLY

BACKGROUND OF THE INVENTION

This invention relates to a fuel assembly for a light water reactor, and more particularly to a fuel assembly having a water rod suitable for reducing a pressure loss and improving the core reactivity gain.

A boiling water reactor is provided with a plurality of fuel assemblies in a core thereof so that the fuel assemblies are spaced from one another. Each fuel assembly consists of a plurality of fuel rods, water rods, upper and lower tie plates, spacers and a channel box.

The water rods are provided with holes in the upper and lower portions of their side surfaces, and a coolant is passed through the interior of each of the water rods via these holes.

In the interior of the fuel assembly, the coolant of water flows to remove the thermal energy which occurs due to a reaction of a fission substance existing in the fuel rods. The water also flows in the spaces among the fuel assemblies, i.e. the exterior of the channel box.

The water functions also as a moderator. The fast neutrons flying out into the water turn into moderated thermal neutrons due to the water. When such thermal neutrons collide with a fission substance, a fission reaction occurs. However, voids occur due to the heat generated by the fuel rods in the channel box. The spaces among the fuel rods are narrower than those among the fuel assemblies, and the former contains more water than the latter. Accordingly, the local atomic ratio of water to fuel in the central portion of the fuel assembly becomes smaller than that in the peripheral portion thereof. As a result, it is difficult for the fast neutrons be moderated in the central portion of the fuel assembly, so that the thermal neutron flux therein tends to become low. This causes the fuel rod power distribution in the fuel assembly to become unbalanced, and has a disadvantageous effect on the economy of fuel. In order to solve this problem, a moderator-container or the water rod is provided in the fuel assembly, which is disclosed in, for example, Japanese Patent Laid-open No. 40986/1975. In recent years, a method of increasing the exposure of a fuel for the purpose of improving the economical efficiency of a nuclear power plant, and of increasing the the diameter of a water rod so as to improve the water to fuel atomic ratio and thereby cope with the increase in the enrichment of fuel has been studied.

Providing a large-diameter water rod or a container, in which a moderator, such as water is held, in the central portion of a fuel assembly is disclosed in Japanese Patent Laid-open Nos. 40986/1975 and 13981/1984. It is known that, owing to such a water rod or container, the distribution of thermal neutron flux in a fuel assembly becomes uniform to cause the simplification of the enrichment distribution and an increase in the reactivity, which enable the economical efficiency of the fuel to be improved.

However, if the diameter of the water rod is increased, the cross-sectional area of the flow passage for a coolant in the fuel assembly decreases. This causes an increase in the pressure loss and a decrease in the thermal margin. Therefore, it is necessary that a suitable countermeasure be provided.

SUMMARY OF THE INVENTION

An object of the present invention is to provide a fuel assembly having a water rod which is capable of minimizing a pressure loss while maintaining an atomic ratio of water to fuel in an optimum level.

Briefly stated, the present invention resides in a fuel assembly having a water rod the length of which is reduced to such an extent that does not disadvantageously affect the nuclear characteristics of the fuel, thereby to reduce a friction pressure loss, which occurs due to the steam-liquid two phase flow, to a low level.

An aspect of the present invention is characterized in that the water rod is larger in diameter than that of the fuel rod and has a height substantially as high as the upper end of an effective enriched fuel section of the fuel rod.

DESCRIPTION OF THE PREFERRED EMBODIMENTS

An embodiment of the present invention will now be described with reference to FIGS. 1, 2 and 3.

Figure 1:
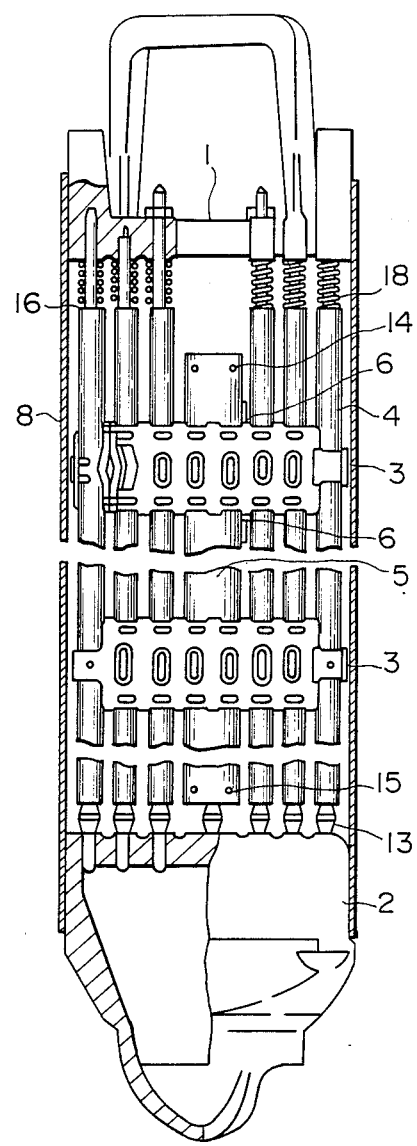
FIG. 1 is a longitudinal section view of a fuel assembly in an embodiment of the present invention.
Figure 2:
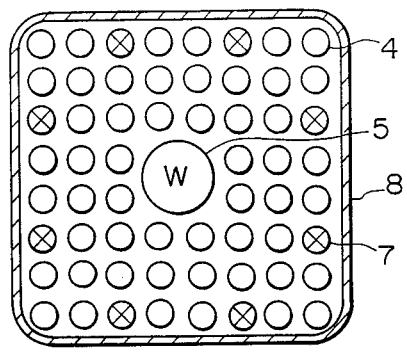
FIG. 2 is a horizontal section of the fuel assembly.

FIG. 1 is a longitudinal section view of a fuel assembly for a boiling water reactor and FIG. 2 is a horizontal section view of the same fuel assembly.

The fuel assembly comprises upper and lower tie plates 1 and 2, a plurality of fuel rods 4, a large central water rod 5, spacers 3 and a channel box 8 enclosing them. The fuel rods 4 and the large central water rod 5 are arranged in such a configuration as shown in FIG. 2.

The fuel rods 4, each of which consists of a cladding of zircaloy, upper and lower end plugs 13, 16 and fuel pellets inserted in the cladding, are held by the upper and lower tie plates 1, 2. The lower end plug 13 of each of the fuel rods 4 is inserted in a hole of the lower tie plate 2 and the upper end plug 16 is loosely inserted in a hole of the upper tie plate 1 so that the upper end of the fuel rod 4 can move in an axial direction. Expansion springs 18, each of which is made of inconel and wound around the upper end plug 16, are inserted between the end portions of the fuel rods 4 and the upper tie plate 1 so as to support the upper tie plate 1. Among the sixty fuel rods 4, the eight fuel rods indicated by a reference numeral 7 constitute tie rods and serve also to join the upper and lower tie plates 1, 2 to each other.

The spacers 3, each of which consists of a zircaloy frame and inconel springs, serve to maintain lateral spacings among the fuel rods 4 and the large central water rod 5. Seven (7) of the spacers 3 are axially distributed between the upper and lower tie plate 2, 1.

The channel box 8 made of zircaloy encloses the fuel rods 4 and the lower and upper ends of the channel box 8 are fitted to the lower and upper tie plates 2, 1, respectively.

The large central water rod 5 is disposed among the fuel rods 4, to be positioned at the central portion of the fuel assembly. The large central water rod 5, the diameter of which is larger than that of the fuel rod 4, is not provided with an upper end plug and an expansion spring, and it is closed at its upper end and has a lower end plug 13. The side surface of the water rod 5 is provided with upper holes 14 at the upper side portion, lower holes 15 at the lower side portion, and a coolant of water is passed through the water rod 5 via the holes 14, 15. The water rod 5 is further provided with tabs for supporting the spacers 3. The water rod 5 is held by the lower tie plate 2 with the lower end plug 13 being inserted in a bore of the lower tie plate 2, and by the spacers 3.

In the interior of the fuel assembly having the abovedescribed construction, water flows to remove the thermal energy which is generated through a reaction of a fission substance in the fuel rods 4. The water also flows in the spaces among the fuel assemblies. The fast neutrons flying out into the water turn into moderated thermal neutrons due to the water. When such thermal neutrons collide with a fission substance, a fission reaction occurs.

In this embodiment, the large central water rod 5 has an outer diameter of 34.8 mm and a thickness of 1.1 mm. The large central water rod 5 occupies a space corresponding to that occupied by four fuel rods 4. The length of the large central water rod 5 is shorter than that of the fuel rod 4.

Figure 3:
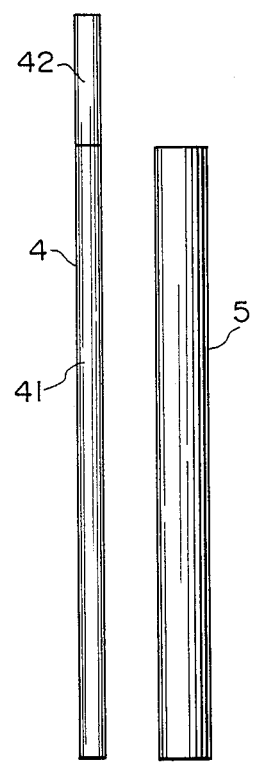
FIG. 3 is a schematic diagram showing the height of a water rod in the fuel assembly, shown in FIGS. 1 and 2.

FIG. 3 is a schematic diagram showing the position of the upper end of the large central water rod 5. In the fuel assembly in this embodiment, the each fuel rod 4 consists of an effective fuel portion 41 filled with fuel pellets, or effective enriched fuel section 41, and a plenum 42 provided on the upper side of the effective fuel portion 41. The position of the upper end of the large central water rod 5 is set substantially as high as that of the upper end of the effective fuel portion 41. Setting these two positions to a substantially equal height means that the upper end of the large central water rod 5 is set slightly higher than that of the effective fuel portion 41 taking the irradiation growth of the effective fuel portion 41, which causes the same portion to expand by about 5 cm, into consideration.

It is known that by providing a large central water rod, the distribution of thermal neutron flux in a fuel assembly may become uniform and may cause the simplification of the enrichment distribution and an increase in the reactivity, which enable the economical efficiency of the fuel to be improved.

However, when the large central water rod having the same length as the fuel rod is provided in the central portion of a fuel assembly, the cross-sectional area of a flow passage for the coolant decreases. Therefore, there is the possibility that the fuel cooling characteristics are deteriorated with the fuel thermal margin decreasing.

Such fuel cooling characteristics are featured by the pressure loss of the coolant flowing in the fuel assembly. Namely, an increase in the pressure loss causes the fuel cooling characteristics to be deteriorated, and a decrease in the pressure loss causes the fuel cooling characteristics to be improved.

The friction pressure loss $\Delta P_f$ due to a steam-liquid two phase flow in a boiling water reactor is generally expressed by the following equation:

$$\Delta P_f = \frac{W^2}{2g\rho} \cdot \frac{f \cdot L}{D_H A_{CH}^2} \phi_{TPF}$$

wherein $\Delta P_f$ is a friction pressure loss, W a flow rate in a channel, g gravitational acceleration, $\rho$ density of water, $D_H$ a hydraulic diameter of the channel, $A_{CH}$ a cross-sectional area of a flow passage in the channel, L a length, f a friction pressure loss coefficient, and $\phi_{TPF}$ a friction factor multiplifier for the two-phase flow.

When the large-diameter water rod is provided instead of four fuel rods in the central portion of the fuel assembly the cross-sectional area $A_{CH}$ of a water flow passage exclusive of the interior of the large-diameter water rod in the channel box decreases, so that a friction pressure loss $\Delta P_f$ increases.

In order to prevent this increase in the friction pressure loss, a step of reducing the length L of a portion, in which a pressure loss occurs, is taken. In this embodiment, the length of the large-diameter water rod is reduced to a suitable length to form the abovedescribed large central water rod 5, for the purpose of reducing the length L of a portion in which a pressure loss occurs. Since the original object of installing the large-diameter water rod resides in the improving of the nuclear characteristics of the effective fuel portion, i.e., the levelling of the distribution of thermal neutron flux in the fuel assembly, it is satisfactory that this large central water rod 5 has the large diameter up to the position which is as high as the upper end of the effective fuel portion of the fuel rod 4. In view of these facts, the large central water rod 5 is employed in this embodiment, the upper end of which water rod 5 is set substantially as high as the upper end of the effective fuel portion 41 of the fuel rod 4.

In the above embodiment, the whole of the effective fuel portion of the fuel rod is filled with enriched fuel pellets. In order to improve the economical efficiency of fuel and increase a shutdown margin of the core, it is effective to provide a natural uranium blanket region on the upper end of the effective fuel portion.

Another embodiment of the present invention, in which a natural uranium blanket region is provided on the upper end of each effective fuel portion, will now be described referring to FIGS. 4, 5.

Figure 4:
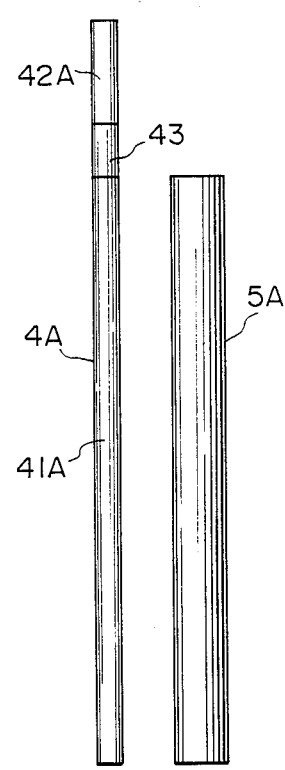
FIG. 4 is a schematic diagram showing the height of a water rod in a fuel assembly in another embodiment of the present invention.
Figure 5:
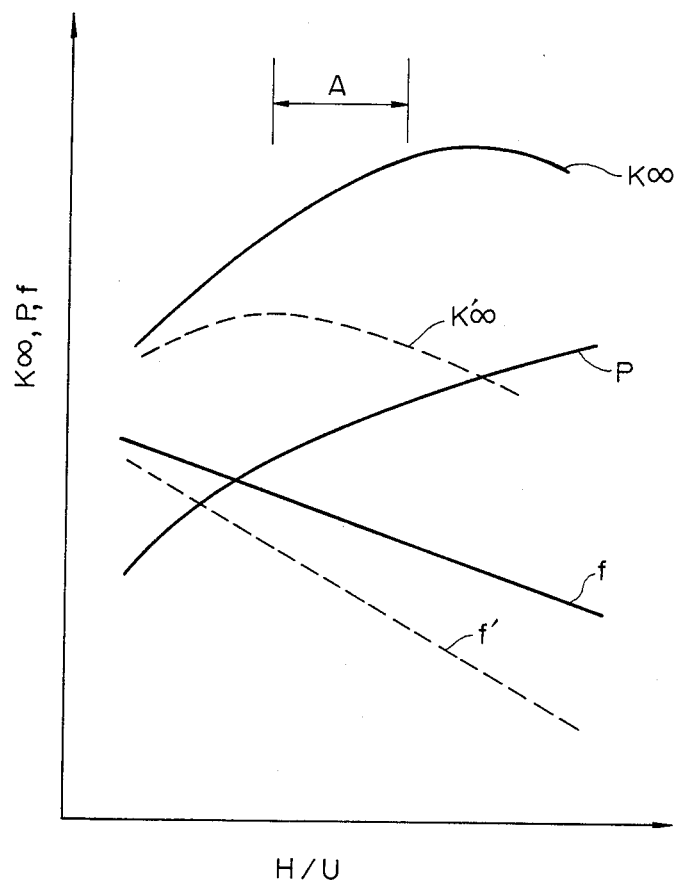
FIG. 5 is a graph showing the dependency of a infinite multiplication factor, a resonance escape probability and a thermal utilization factor upon H/U ratios.

FIG. 4 is a schematic diagram showing the height of the upper end of a large central water rod 5A in comparison with that of the upper end of an effective fuel portion, on which a natural uranium blanket region is provided, of a fuel rod 4A. In this embodiment, the effective fuel portion consists of an effective enriched fuel section 41A and a natural uranium blanket region 43 provided on the section 41A, and a plenum 42A is positioned on this natural uranium blanket region 43. The height of the upper end of the large central water rod 5A is set substantially equal to that of the upper end of the effective enriched fuel section 41A, i.e. the lower end of the natural uranium blanket region 43, and not the upper end of the effective fuel portion. The large central water rod 5A is not extended to the height which is equal to that of the upper end of the natural uranium blanket region taking the nuclear characteristics of the same region into consideration. The matter will further be described.

In general, the infinite multiplication factor of a fuel attains its maximum level when the quantity of moderator is increased, and it tends to decrease when the quantity of moderator is increased after the maximum level has been attained. FIG. 5 shows a relationship between the infinite multiplication factor $K_\infty$ of a fuel and the quantity of moderator. The atomic ratio of hydrogen to uranium (H/U ratio) is taken along the lateral axis of FIG. 5. When the quantity of water as a moderator is increased, the H/U ratio increases.

The infinite multiplication factor has a maximum value with respect to the quantity of moderator for the following reasons. When the H/U ratio increases, the moderation of neutrons is promoted. Consequently, the resonance escape probability P increases, while the thermal neutron absorption rate of the moderator also increases. Accordingly, the thermal utilization factor f decreases, and P and f offset each other. A fuel for a boiling water reactor is within the range of insufficient moderation, which corresponds to the region A in FIG. 5, in a regular operational region thereof, in which the reactor is kept in an easily-self-controllable state with the power reactivity coefficient set in a negative level.

However, since the content of uranium 235 of natural uranium is $\frac{1}{3}$-$\frac{1}{4}$ of that of a regular enriched fuel, the thermal neutron absorption cross section of uranium 235 decreases, and the thermal utilization factor f also decreases. Also, a total thermal neutron absorption cross section decreases, so that the percentage of the thermal neutron absorption cross section of the moderator relatively increases. Therefore, when the H/U ratio varies, the variation rate of the thermal utilization factor f becomes high. Accordingly, as shown by broken lines in FIG. 5, the thermal utilization factor f' of natural uranium tends to lower along a rightwardly-lowering inclined line of a large angle of inclination, and a maximum value of the infinite multiplication factor $K_\infty'$ thereof is shifted to left, as compared with those of a regular enriched fuel. In view of the above, it is considered that the natural uranium is put in an excessively-moderated state in a regular operation region, and that, when the H/U ratio has increased, the infinite multification factor decreases.

Due to the above described nuclear characteristics of natural uranium, extending the large central water rod 5A up to a position which corresponds to the natural uranium blanket region of a fuel rod causes the core reactivity to be slightly lost. Hence, as shown in FIG. 4, the height of the upper end of the large central water rod 5A is determined. This enables the length of the water rod to be reduced to a level within a range, which does not disadvantageously affect the nuclear characteristics of a fuel, and a pressure loss to be minimized.

In the two embodiments described above, a large central water rod is employed according to the present invention. The effect of the present invention can be satisfactorily be obtained not only in a fuel assembly which uses this large central water rod but also in a fuel assembly which has a water rod of the same diameter as that of a conventional water rod and to which the present invention is applied.

According to the present invention, the pressure loss in a two-phase flow portion of a fuel can be reduced without disadvantageously affecting the economical efficiency of the fuel, and the stability of a nuclear reactor and the thermal margin thereof can be improved.

What is claimed is:

1. A fuel assembly comprising:
   upper and lower tie plates disposed so as to be spaced from each other;
   a plurality of fuel rods both end portions of each of which is held by said upper and lower tie plates;
   a plurality of spacers disposed between said upper and lower tie plates for providing spacings between said fuel rods;
   a water rod disposed among said fuel rods and held at its lower end portion by said lower tie plate, said water rod having holes for passing water therethrough at its side portion, and a closed upper end portion of said water rod being substantially as high as an upper end of an effective enriched fuel section, which is filled with enriched fuel, of said each fuel rod; and
   a channel box enclosing said fuel rods and said water rod, said upper and lower tie plates being fitted in said channel box;
   wherein said water rod has a larger diameter than that of each of said fuel rods, and is disposed among said fuel rods so as to be positioned at a substantially central portion of said fuel assembly.

2. The fuel assembly as defined in claim 1, wherein each of said fuel rods has a natural uranium blanket on said effective fuel portion, said upper end of said water rod being set substantially as high as a lower end of said natural uranium blanket region.

3. The fuel assembly as defined in claim 1, wherein said closed upper end portion of said water rod is spaced from said upper tie plate so that said water rod does not engage said upper tie plate.

4. The fuel assembly as defined in claim 3, wherein each fuel rod includes an effective enriched fuel section and a plenum section at the upper end of said fuel rod, said closed upper end portion of said water rod having a height substantially as high as said upper end of said effective enriched fuel section and a height substantially less than an upper end of said plenum section of said fuel rod.

5. The fuel assembly as defined in claim 4, wherein each of said fuel rods has a natural uranium blanket region on said effective fuel portion, said plenum section being disposed above said natural uranium blanket region, said upper end of said water rod having a height substantially as high as a lower end of said natural uranium blanket region.

6. A fuel assembly comprising:
   a channel box elongated axially;
   upper and lower tie plates mounted in upper and lower end portions of said channel box;
   fuel rods disposed in said channel box and held by said upper and lower tie plates at upper and lower ends of said fuel rods, respectively;
   a large diameter central water rod disposed among said fuel rods around an axis of said channel box, and having a larger diameter than said each fuel rod, said large diameter central water rod having a closed upper end portion, and having holes for passing water at upper and lower side portions, and having a lower end plug held by said lower tie plate, and the upper end portion of said large diameter central water rod being substantially as high as an upper end of an effective enriched fuel section of said each fuel rod; and
   spacers, disposed between said upper and lower tie plates, for keeping said fuel rods and said large diameter central water rod spaced from one another.

7. The fuel assembly as defined in claim 6, wherein the diameter of said large diameter central water rod is extended to the extent that said large diameter central water rod occupies a space corresponding to one occupied by four of said fuel rods.

8. The fuel assembly as defined in claim 7, wherein said large diameter central water rod is provided with tabs engaged with said spacers.

9. The fuel assembly as defined in claim 6, wherein said closed upper end portion of said water rod is spaced from said upper tie plate so that said water rod does not engage with upper tie plate.

10. The fuel assembly as defined in claim 9, wherein each fuel rod includes an effective enriched fuel section and a plenum section at the upper end of said fuel rod, said closed upper end portion of said water rod having a height substantially as high as said upper end of said effective enriched fuel section and a height substantially less than an upper end of said plenum section of said fuel rod.

11. The fuel assembly as defined in claim 10, wherein each of said fuel rods has a natural uranium blanket region on said effective fuel portion, said plenum section being disposed above said natural uranium blanket region, said upper end of said water rod having a height substantially as high as a lower end of said natural uranium blanket region.

12. A fuel assembly comprising:
upper and lower tie plates;
a plurality of fuel rods each held by said upper and lower tie plates at upper and lower ends of said fuel rods, respectively, each of said fuel rods including an effective enriched fuel section and a plenum section thereon;
a plurality of spacers arranged axially for keeping said fuel rods spaced from each other; and
a large diameter central water rod, disposed among said fuel rods so as to be positioned at a central portion of said fuel rods, and having a larger diameter than said each fuel rod;
said large diameter central water rod having a lower end plug held by said lower tie plate and an upper closed end spaced from said upper tie plate so as to not engage said upper tie plate, said large diameter central water rod having holes for passing water therethrough proximate to the upper and lower ends thereof, said large diameter central water rod having a height at the upper end substantially as high as an upper end of said effective enriched fuel section of said each fuel rod which is filled with enriched fuel pellets.

13. The fuel assembly as defined in claim 12, wherein said large diameter central water rod occupies a space corresponding to four of said fuel rods, said large diameter central water rod having tabs for engaging said spacers.

14. The fuel assembly as defined in claim 13, wherein said upper closed end of said large diameter central water rod has a substantially flat shape and has a height so as to provide a space between said upper closed end of said large diameter central water rod and said upper tie plate.

* * * * *